US008656019B2

(12) United States Patent
Chikando et al.

(10) Patent No.: US 8,656,019 B2
(45) Date of Patent: Feb. 18, 2014

(54) DATA PROCESSING WORKLOAD ADMINISTRATION IN A CLOUD COMPUTING ENVIRONMENT

(75) Inventors: Eric N. Chikando, Raleigh, NC (US); Marcus L. Kornegay, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 12/640,078

(22) Filed: Dec. 17, 2009

(65) Prior Publication Data

US 2011/0153824 A1 Jun. 23, 2011

(51) Int. Cl.
*G06F 15/173* (2006.01)

(52) U.S. Cl.
USPC ............ 709/226; 709/203; 709/224; 709/225

(58) Field of Classification Search
USPC .................................. 709/226, 203, 224–225
See application file for complete search history.

(56) References Cited

U.S. PATENT DOCUMENTS

| 6,880,002 | B2 | 4/2005 | Hirschfeld et al. | |
|---|---|---|---|---|
| 7,350,186 | B2 | 3/2008 | Coleman et al. | |
| 7,512,702 | B1 * | 3/2009 | Srivastava et al. | 709/238 |
| 7,596,620 | B1 | 9/2009 | Colton et al. | |
| 8,250,215 | B2 * | 8/2012 | Stienhans et al. | 709/227 |
| 2009/0113442 | A1 | 4/2009 | Deidda et al. | |
| 2009/0172101 | A1 | 7/2009 | Arthursson | |
| 2009/0241117 | A1 | 9/2009 | Dasgupta et al. | |
| 2009/0271468 | A1 | 10/2009 | DiStefano | |
| 2009/0271472 | A1 | 10/2009 | Scheifler et al. | |
| 2010/0125664 | A1 * | 5/2010 | Hadar et al. | 709/224 |
| 2010/0131948 | A1 * | 5/2010 | Ferris | 718/1 |
| 2010/0169477 | A1 * | 7/2010 | Stienhans et al. | 709/224 |
| 2010/0169497 | A1 * | 7/2010 | Klimentiev et al. | 709/228 |
| 2011/0016214 | A1 * | 1/2011 | Jackson | 709/226 |
| 2011/0055398 | A1 * | 3/2011 | Dehaan et al. | 709/226 |
| 2011/0078303 | A1 * | 3/2011 | Li et al. | 709/224 |

FOREIGN PATENT DOCUMENTS

WO WO 2009/059377 A1 5/2009

* cited by examiner

*Primary Examiner* — Duyen Doan
(74) *Attorney, Agent, or Firm* — Edward J. Lenart; Thomas E. Tyson; Biggers Kennedy Lenart Spraggins LLP

(57) ABSTRACT

Data processing workload administration in a cloud computing environment including distributing data processing jobs among a plurality of clouds, each cloud comprising a network-based, distributed data processing system that provides one or more cloud computing services; deploying, by a job placement engine in each cloud according to the workload execution policy onto servers in each cloud, the data processing jobs distributed to each cloud; determining, by each job placement engine during execution of each data processing job, whether workload execution policy for each deployed job continues to be met by computing resources within the cloud where each job is deployed; and advising, by each job placement engine, the workload policy manager when workload execution policy for a particular job cannot continue to be met by computing resources within the cloud where the particular job is deployed.

17 Claims, 5 Drawing Sheets

DATA PROCESSING WORKLOAD ADMINISTRATION IN A CLOUD COMPUTING ENVIRONMENT

BACKGROUND OF THE INVENTION

1. Field of the Invention

The field of the invention is data processing, or, more specifically, methods, apparatus, and products for data processing workload administration in a cloud computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of technology that has seen recent advancement is cloud computing. Cloud computing is increasingly recognized as a cost effective means of delivering information technology services through a virtual platform rather than hosting and operating the resources locally. However, the large scale take-off of cloud technology is hindered by significant issues of data security, privacy, and other policy challenges. Current cloud control policies are designed from centralized controller architecture limiting the ability of the network to efficiently reallocate resources in response to an increase in workload demand—with no provisions for self-regulating feedback to adaptively redistribute workload when policy requirements are no longer met.

SUMMARY OF THE INVENTION

Data processing workload administration in a cloud computing environment including distributing, by a workload policy manager on behalf of cloud clients according to a workload execution policy, data processing jobs among a plurality of clouds, each cloud comprising a network-based, distributed data processing system that provides one or more cloud computing services, the cloud computing services comprising Software as a Service ('SaaS') and Platform as a Service ('PaaS'); deploying, by a job placement engine in each cloud according to the workload execution policy onto servers in each cloud, the data processing jobs distributed to each cloud; determining, by each job placement engine during execution of each data processing job, whether workload execution policy for each deployed job continues to be met by computing resources within the cloud where each job is deployed; and advising, by each job placement engine, the workload policy manager when workload execution policy for a particular job cannot continue to be met by computing resources within the cloud where the particular job is deployed.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
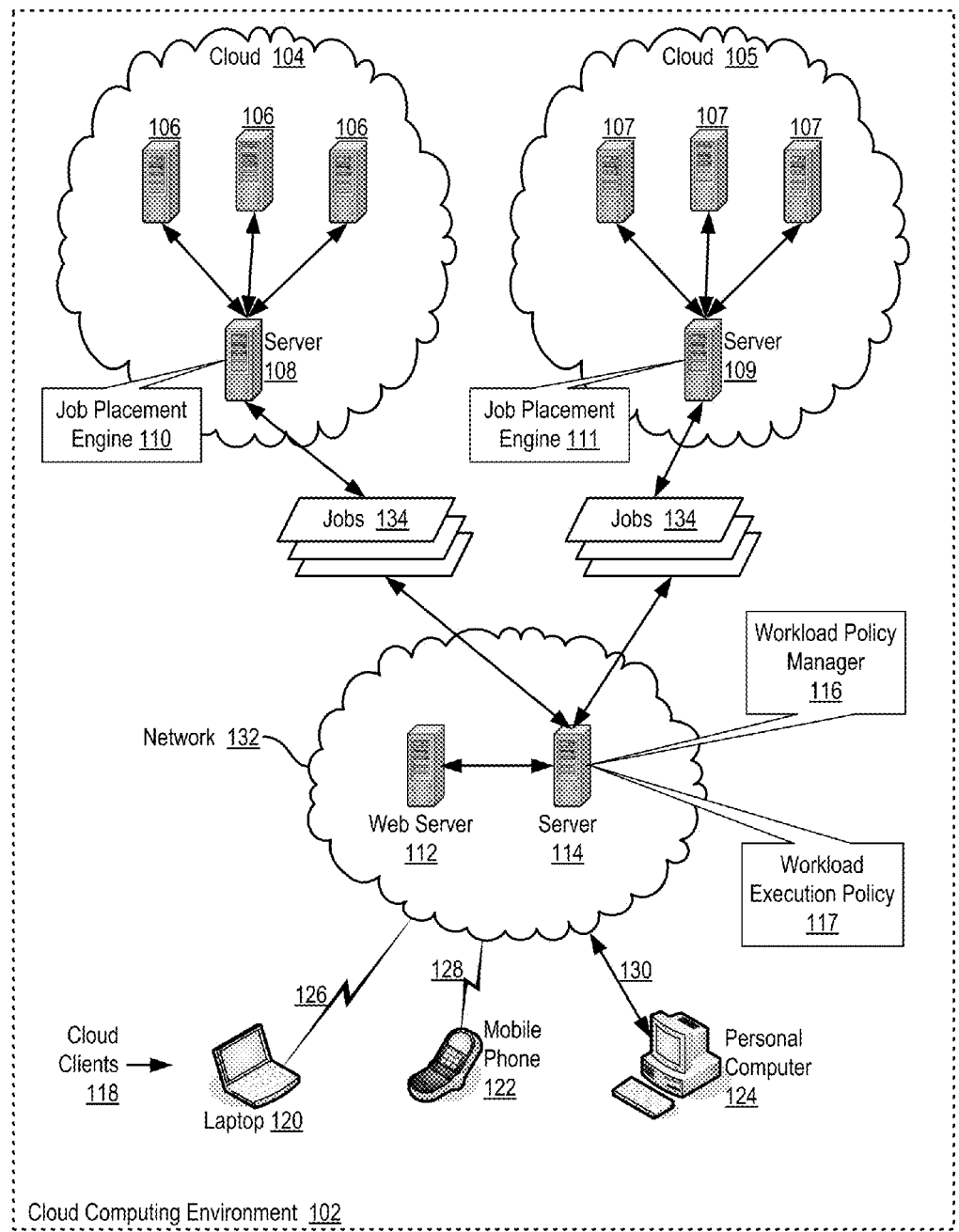
FIGS. 1-4 set forth network diagrams of a cloud computing environments that supports data processing workload administration according to embodiments of the present invention.

Example methods, apparatus, and products for data processing workload administration in a cloud computing environment in accordance with the present invention are described with reference to the accompanying drawings, beginning with FIG. 1. FIG. 1 sets forth a network diagram of a cloud computing environment (102) that supports data processing workload administration according to embodiments of the present invention. The cloud computing environment of FIG. 1 includes a plurality of clouds, only two clouds (104, 105) for ease of explanation in this example, although cloud computing environments according to embodiments of the present invention can include any number of clouds. Each cloud (104, 105) is a network-based, distributed data processing system that provides one or more cloud computing services. Typical examples of cloud computing services include Software as a Service ('SaaS') and Platform as a Service ('PaaS'). SaaS is a model of software deployment in which a provider licenses an application to customers for use as a service on demand. SaaS software vendors may host the application on their own clouds or download such applications from clouds to cloud clients, disabling the applications after use or after an on-demand contract expires.

PaaS is the delivery from a cloud of a computing platform and solution stack as a service. PaaS includes the provision of a software development platform designed for cloud computing at the top of a cloud stack. PaaS also includes workflow facilities for application design, application development, testing, deployment and hosting as well as application services such as team collaboration, web service integration and marshalling, database integration, security, scalability, storage, persistence, state management, application versioning, application instrumentation and developer community facilitation. These services are provisioned as an integrated solution over a network, typically the World Wide Web ('web') from a cloud. Taken together, SaaS and PaaS are sometimes referred to as 'cloudware.'

In addition to SaaS and PaaS, cloud computing services can include many other network-based services, such as, for example, utility computing, managed services, and web services. Utility computing is the practice of charging for cloud services like utilities, by units of time, work, or resources provided. A cloud utility provider can, for example, charge cloud clients for providing for a period of time certain quantities of memory, I/O support in units of bytes transferred, or CPU functions in units of CPU clock cycles utilitized.

Managed services implement the transfer of all management responsibility as a strategic method for improving data processing operations of a cloud client, person or organization. The person or organization who owns or has direct oversight of the organization or system being managed is referred to as the offerer, client, or customer. The person or organization that accepts and provides the managed service from a cloud is regarded as a managed service provider or 'MSP.' Web services are software systems designed to support interoperable machine-to-machine interaction over a network of a cloud.

Web services provide interfaces described in a machine-processable format, typically the Web Services Description Language ('WSDL'). Cloud clients interact with a cloud's web services as prescribed by WSDL descriptions using Simple Object Access Protocol ('SOAP') messages, typically conveyed using the HyperText Transport Protocol ('HTTP') with an eXtensible Markup Language ('XML') serialization.

The example cloud computing environment (102) of FIG. 1 also include a workload policy manager (116) running on a server (116) in a network (132) that connects cloud clients (118) for data communications with the clouds (104, 105). The network (132) is typically an internet, a local or wide area network composed of data communications routers operating according to the Internet Protocol ('IP'). The workload policy manager (116) is a module of automated computing machinery, hardware, software, or a combination of hardware and software, configured to distribute data processing jobs (134) among the clouds (104, 105). The workload policy manager (116) functions by distributing, on behalf of cloud clients (118) according to a workload execution policy (117), data processing jobs among the clouds (104, 105). Each cloud client (118) is a module of automated computing machinery, hardware, software, or a combination of hardware and software, that relies upon cloud computing services for application delivery. Some cloud clients are specifically designed for application delivery from cloud services. All cloud clients are practically useless for cloud application delivery without cloud services. Examples of cloud clients, in terms of hardware, include as shown here a laptop computer (120) connected to network (132) through a wireless connection (126), a mobile telephone (122) connected to network (132) through a wireless connection (128), and a personal computer (124) connected to network (132) through a wireline connection (130). Further examples of cloud clients include other mobile clients such as the Palm Pre™, the Google Android™, and the Apple iPhone™. Cloud clients include devices specifically designed to rely on cloud services provided to 'thin clients,' devices that provide user interfaces but rely on a cloud PaaS, even in some cases for operating systems, such as, the CherryPal™ cloud computer, the Wyse Winterm™, and the Zonbu™ computing platform. Examples of 'thick' software cloud clients include Mozilla Firefox™, Google's Chrome™, and Apple's WebKit™.

The workload execution policy (117) is composed of associations of data processing job specifications for the data processing jobs and cloud computing resources provided by the clouds. The data processing jobs are data processing tasks requested by cloud clients and executed by servers (106, 107) in the clouds (104, 105). Data processing jobs can include anything executable on a cloud server, including for example, data entry in word processing documents, spreadsheet administrations, database management tasks, massively parallel computations, modeling of physical processes, email administration, operation of online presentation tools, calendar services, customer relations management, online conference support, accounting services, social networking, online sales and purchasing support, voice communications such Voice Over Internet Protocol ('VoIP'), and so on, and so on, and so on.

The cloud computing resources provided by the cloud include runtime requirements of computing resources to be provided from a cloud for data processing jobs, and specifications of how cloud services and resources are to be provided can be set forth in service level agreements or 'SLAs.' Runtime requirements can be defined in terms of hardware resources, CPU speeds available from servers in a cloud, CPU cycles available in a cloud, I/O facilities available in a cloud, types and quantities of memory available in a cloud, and so on. An SLA is a specification of a level of service to be provided from a cloud to a cloud client. Specifications set forth as an ' SLA' can be informal or formal, even in some cases part of a legally binding service contract. SLA specifications can include descriptions of services, priorities, responsibilities, guaranteed minima and maxima, delivery or performance times and schedules, and so on. SLAs can specify levels of availability, serviceability, performance, operation, or other attributes of a cloud service, such as costs and billing schedules. SLA specifications can be characterized as 'target' levels or 'minimum' levels, allowing cloud clients to be informed what to expect (the minimum), while also providing a measurable (average) target value that shows a typical level of performance.

TABLE 1

Cloud Computing Resources

| Rec. No. | Cloud ID | Service Type | Service Description | Run Time | SLA |
|---|---|---|---|---|---|
| 1 | 104 | PaaS | x86, Windows ™ | | |
| 2 | 104 | SaaS | Billing | | |
| 3 | 104 | SaaS | General Ledger | | |
| 4 | 104 | | | CPU, Mem, I/O | |
| 5 | 104 | | | | Type, Value |
| 6 | 105 | PaaS | Power ™, Linux ™ | | |
| 7 | 105 | SaaS | Word Processing | | |
| 8 | 105 | SaaS | Spreadsheet | | |
| 9 | 105 | | | CPU, Mem, I/O | |
| 10 | 105 | | | | Type, Value |

Cloud computing resources provided by clouds is further explained with reference to Table 1. Each record in Table 1 associates computing resources with a particular cloud. The resources include services, run time resources, and SLA undertakings available in the clouds. In particular, records 1-5 represent respectively the availability in cloud (104) of PaaS as x86 hardware running Windows OS, Billing SaaS, General Ledger SaaS, availability of certain run time resources described as CPU, Memory, and I/O resources, and available SLA undertaking in terms of type and value, e.g., maximum job duration undertakings, maximum response time undertakings, and so on. Similarly, records 6-10 represent respectively the availability in cloud (105) of PaaS as Power hardware running a Linux OS, word processing SaaS, spreadsheet SaaS, availability of certain run time resources described as CPU, Memory, and I/O resources, and available SLA undertaking in terms of type and value.

TABLE 2

Workload Execution Policies

| Job Specifications | | Run Time | | | SLA | |
|---|---|---|---|---|---|---|
| Cloud Client | Job Type | CPU (cycles) | Memory (gb ram) | I/O (type) | Spec. Type | Spec. Value |
| UserID-1 | Acc | $10^{14}$ | 10 | SAN | Max Dur | 5 hrs |
| UserID-1 | WP | $10^{6}$ | 1 | UI | Max Resp | 0.2 sec |

TABLE 2-continued

Workload Execution Policies

| Job Specifications | | | Run Time | | SLA | |
|---|---|---|---|---|---|---|
| Cloud Client | Job Type | CPU (cycles) | Memory (gb ram) | I/O (type) | Spec. Type | Spec. Value |
| UserID-2 | Spread | $10^6$ | 1 | UI | PaaS | PwrLin |
| UserID-3 | Spread | $10^6$ | 1 | UI | SaaS | MS |
| UserID-3 | DB | $10^{14}$ | 10 | SAN | PaaS | x86/Win |

Associations of data processing job specifications for the data processing jobs and cloud computing resources provided by the clouds can be implemented as illustrated, for example, by Table 2. The records in Table 2 represent a workload execution policies (117), that is, associations of specifications of data processing jobs in terms of job type for a particular cloud client and cloud computing resources expressed as run time requirements in terms of CPU, memory, and I/O requirements and required SLA undertakings expressed in terms of SLA specification type and value. In particular, the records in the example of Table 2 represent respectively workload execution policies specifying cloud computing resource requirements:

- for accounting jobs for a cloud client identified as UserID-1 of 100 billion CPU cycles, 10 gigabytes of RAM, I/O to a Storage Area Network, and an SLA undertaking of a maximum job duration of 5 hours,
- for word processing jobs for a cloud client UserID-1 of 1 million CPU cycles, 1 gigabyte of RAM, I/O through a user interface, and an SLA undertaking of a maximum response time to user input of 0.2 seconds,
- for spreadsheet jobs for a cloud client identified as UserID-2 of 1 million CPU cycles, 1 gigabyte of RAM, I/O through a user interface, and an SLA undertaking for a cloud to provide a platform of Power hardware running a Linux OS,
- for spreadsheet jobs for a cloud client identified as UserID-3 of 1 million CPU cycles, 1 gigabyte of RAM, I/O through a user interface, and an SLA undertaking to provide a Microsoft spreadsheet as a service, and
- for database management jobs for cloud client UserID-3 of 100 billion CPU cycles, 10 gigabytes of RAM, I/O to a Storage Area Network, and an SLA undertaking for a cloud to provide a platform of x86 hardware running a Windows OS.

Tables 1 and 2 aid in explanation of the function of the workload policy manager (116). As mentioned, the workload policy manager (116) distributes data processing jobs (134) among the clouds (104, 105) by distributing, on behalf of cloud clients (118) according to a workload execution policy (117), data processing jobs among the clouds (104, 105). The workload policy manager (116), or at least the server (114) upon which the workload policy manager is deployed, can be configured with information of the kind illustrated by Tables 1 and 2, accessible in memory to the workload policy manager, so that the workload policy manager (116), upon receiving from a cloud client a request for data processing services, that is, a request for execution of a data processing job, can look up in Table 2, on the basis of the job type and the identity of the cloud client requesting the job, the cloud computing resources required by each such data processing job. The workload policy manager (116) then can determine by use of the information in Table 1 which cloud or clouds can provide the required cloud computing resources for any particular job and distribute each job to a cloud that can meet the workload execution policy requirements for the job. In a particular example according to the information in Tables 1 and 2, the workload policy manager (116), in distributing data processing jobs among clouds according to workload execution policies, will distribute spreadsheet jobs for cloud client UserID-2 only to cloud (105), because only cloud (105) can meet the workload execution policy requirement to provide the PaaS of Power hardware running a Linux OS.

In the example cloud computing (102) environment of FIG. 1, each cloud (104, 105) includes a job placement engine (110, 111). Each job placement engine is implemented as a module of automated computing machinery configured to deploy data processing jobs on servers of a cloud. In the particular example of FIG. 1, each job placement engine (110, 111) is a module installed and running on a server (108, 109) in a cloud (104, 105). Each job placement engine deploys, in each cloud according to workload execution policy onto servers (106, 107) in each cloud, the data processing jobs (134) distributed to each cloud by the workload policy manager.

The job placement engines (110, 111) also monitor the process of job execution on the servers (106, 107) of the clouds and determine during execution of each data processing job whether workload execution policy for each deployed job continues to be met by computing resources within the cloud where each job is deployed. The job placement engines method can determine whether workload execution policy for each deployed job continues to be met by determining that workload execution policy for at least one deployed job is not currently met by the server upon which the at least one job is deployed, and then determining whether there is another server within the same cloud upon which the workload execution policy can be met. A job placement engine can then redeploy such a job within the same cloud if there is another server within the same cloud upon which the workload execution policy can be met—determining that workload execution policy for a particular job cannot continue to be met by computing resources within the cloud where the particular job is deployed only after trying a failing to find within the same cloud another server upon which the workload execution policy for the job can be met.

The job placement engines also advise the workload policy manager (116) when workload execution policy for a particular job cannot continue to be met by computing resources within the cloud where the particular job is deployed. The workload policy manager (116) then determines whether to leave the job where it is presently deployed and accept performance that does not really meet the policy, redistribute the job to another cloud where the policy can be met, or kill the job and advise the cloud client of failure.

In some embodiments, a job placement engine (110, 111), when advising the workload policy manager (116) that workload execution policy for a particular job cannot continue to be met by computing resources within the cloud where the particular job is deployed also advises the workload policy manager (116) of the existence of any jobs deployed within the same cloud having lower priorities than the particular job for which policy cannot continue to be met. In such embodiments, the workload policy manager also determines whether to preempt one or more of the lower priority jobs in the same cloud—and advise the job placement engine to redeploy the job within the same cloud—or redistribute the particular job to another cloud.

The arrangement of servers and other devices making up the example system illustrated in FIG. 1 are for explanation, not for limitation. Data processing systems capable of data processing workload administration in a cloud computing environment according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
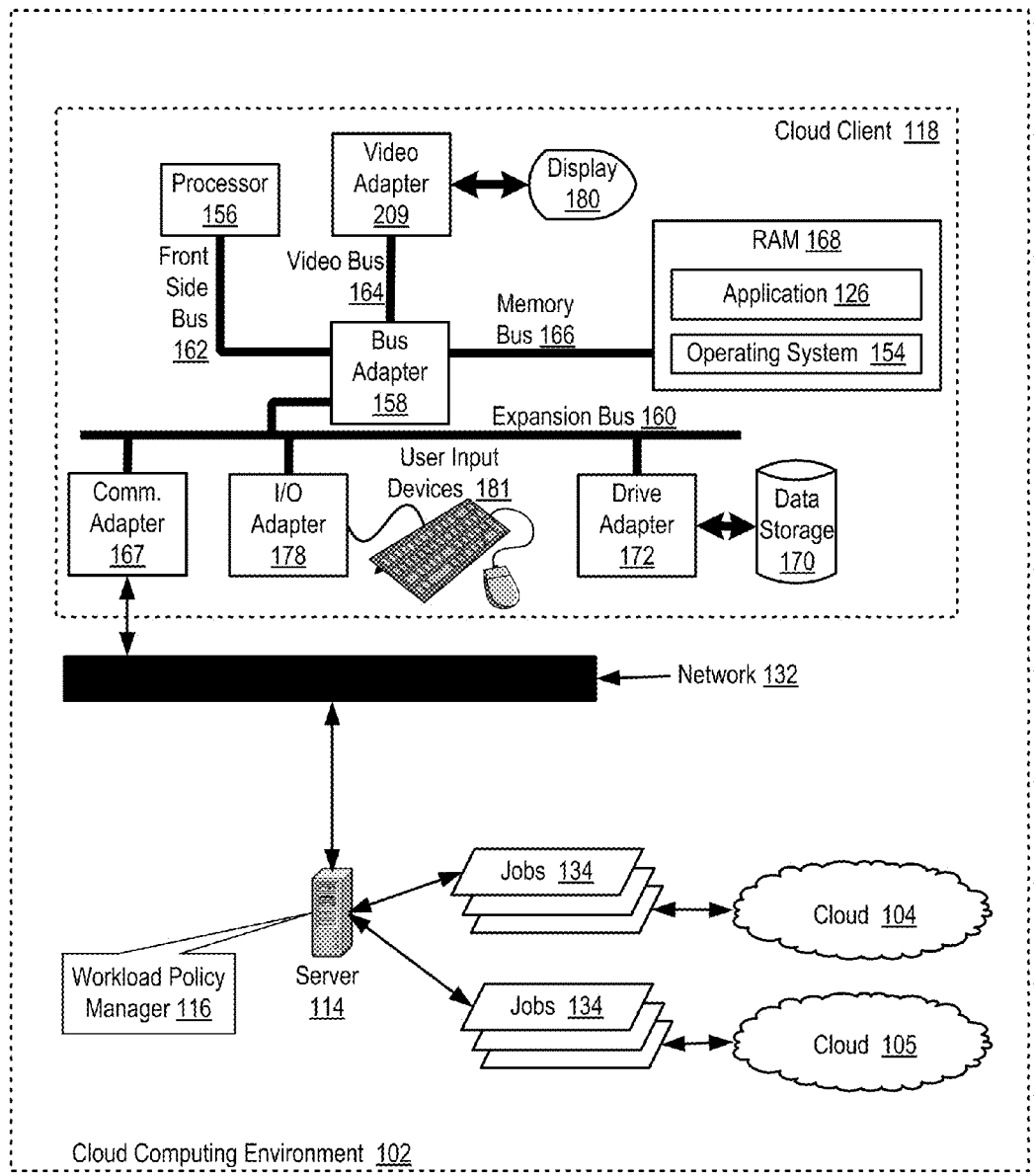

For further explanation of cloud clients, FIG. 2 sets forth a network diagram of a cloud computing environment (102) that supports data processing workload administration according to embodiments of the present invention, including a functional block diagram of a cloud client (118). The cloud computing environment (102) in the example of FIG. 2 is like the cloud computing environment of FIG. 1, including as it does the cloud client (118) coupled for data communications through a data communications network (132) to a workload policy manager (116), running on a server (114), that distributes data processing jobs (134) among a number of clouds (104, 105). The cloud client (118) of FIG. 2 includes at least one computer processor (156) or 'CPU' as well as random access memory (168) ('RAM') which is connected through a high speed memory bus (166) and bus adapter (158) to processor (156) and to other components of the cloud client (118).

Stored in RAM (168) is an application (168), a user-level module of computer program instructions for carrying out particular data processing tasks requiring cloud computing services for application delivery to the cloud client or a user of the cloud client. Also stored in RAM (168) is an operating system (154). Operating systems useful data processing workload administration in a cloud computing environment according to embodiments of the present invention include UNIX™, Linux™, Microsoft XP™, AIX™, IBM's i5/OS™, and others as will occur to those of skill in the art. The application (168) and the operating system (154) in the example of FIG. 2 are shown in RAM (168), but many components of such software typically are stored in non-volatile memory also, such as, for example, on a disk drive (170).

The cloud client (118) of FIG. 2 includes disk drive adapter (172) coupled through expansion bus (160) and bus adapter (158) to processor (156) and other components of the cloud client (118). Disk drive adapter (172) connects non-volatile data storage to the cloud client (118) in the form of disk drive (170). Disk drive adapters useful in computers for data processing workload administration in a cloud computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example cloud client (118) of FIG. 2 includes one or more input/output ('I/O') adapters (178). I/O adapters implement user-oriented I/O through, for example, software drivers and computer hardware for controlling output to display devices such as computer display screens, as well as user input from user input devices (181) such as keyboards and mice. The example cloud client (118) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example cloud client (118) of FIG. 2 includes a communications adapter (167) for data communications with a data communications network (132). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing workload administration in a cloud computing environment according to embodiments of the present invention include modems for wired dial-up communications, Ethernet (IEEE 802.3) adapters for wired data communications network communications, and 802.11 adapters for wireless data communications network communications.

Figure 3:
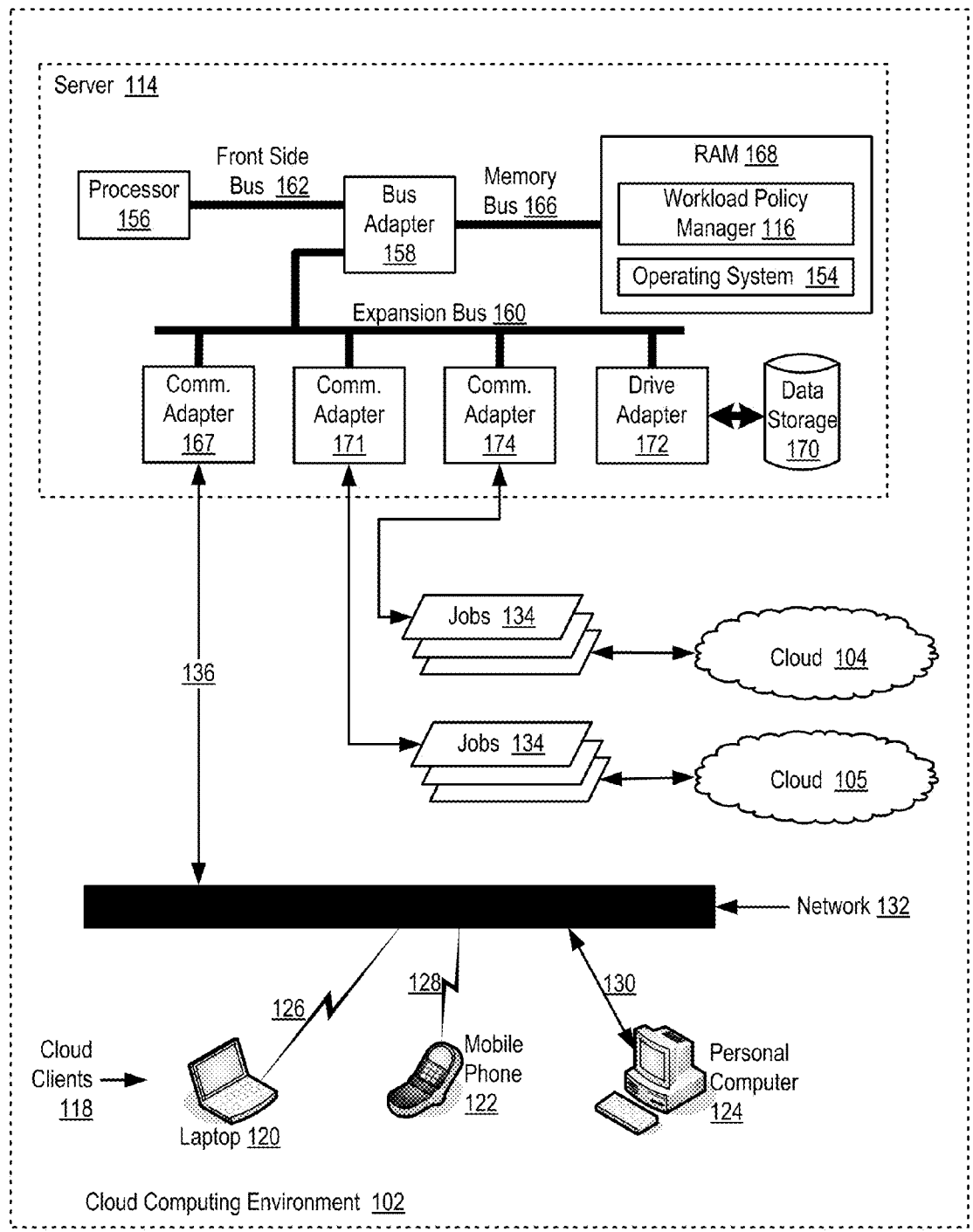

For further explanation of workload policy managers, FIG. 3 sets forth a network diagram of a cloud computing environment (102) that supports data processing workload administration according to embodiments of the present invention, including a functional block diagram of a server (114) running a workload policy manager (116). The cloud computing environment (102) in the example of FIG. 3 is like the cloud computing environment of FIG. 1, including as it does cloud clients (118) coupled for data communications through a data communications network (132) to a workload policy manager (116), running on a server (114), that distributes data processing jobs (134) among a number of clouds (104, 105). The server (114) of FIG. 3 includes at least one computer processor (156) or 'CPU' as well as random access memory (168) ('RAM') which is connected through a high speed memory bus (166) and bus adapter (158) to processor (156) and to other components of the server (114). Stored in RAM (168) is a workload policy manager (116), a module of automated computing machinery configured to distribute data processing jobs among clouds. In this example, the workload policy manager (116) is represented for ease or explanation as a user-level module of computer program instructions configured to distribute data processing jobs among clouds from a generally programmable computer server (114), although such an architecture or implementation is not a limitation of the present invention. Workload policy managers according to embodiments of the present invention can be implemented alternatively, for example, as Complex Programmable Logic Devices ('CPLDs'), Field Programmable Gate Arrays ('FPGAs'), or Application-Specific Integrated Circuits ('ASICs'). In this particular example, with only one application running on the server (114) and that being the workload policy manager (116), the server (114) itself is effectively implemented as a workload policy manager.

Also stored in RAM (168) in the example of FIG. 3 is an operating system (154). Operating systems useful with workload policy managers for data processing workload administration in a cloud computing environment according to embodiments of the present invention include UNIX™, Linux™, Microsoft XP™, AIX™, IBM's i5/OS™, and others as will occur to those of skill in the art. The workload policy manager (116) and the operating system (154) in the example of FIG. 3 are shown in RAM (168), but many components of such software typically are stored in non-volatile memory also, such as, for example, on a disk drive (170).

The server (114) of FIG. 3 includes disk drive adapter (172) coupled through expansion bus (160) and bus adapter (158) to processor (156) and other components of the server (114). Disk drive adapter (172) connects non-volatile data storage to the server (114) in the form of disk drive (170). Disk drive adapters useful in computers for data processing workload administration in a cloud computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (114) of FIG. 3 includes communications adapters (167, 171, 174) for data communications with a data communications network (132) and with clouds (104, 106). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing workload administration in a cloud computing environment according to embodiments of the present invention include modems for wired dial-up communications, Ethernet (IEEE 802.3) adapters for wired data communications network communications, and 802.11 adapters for wireless data communications network communications.

Figure 4:
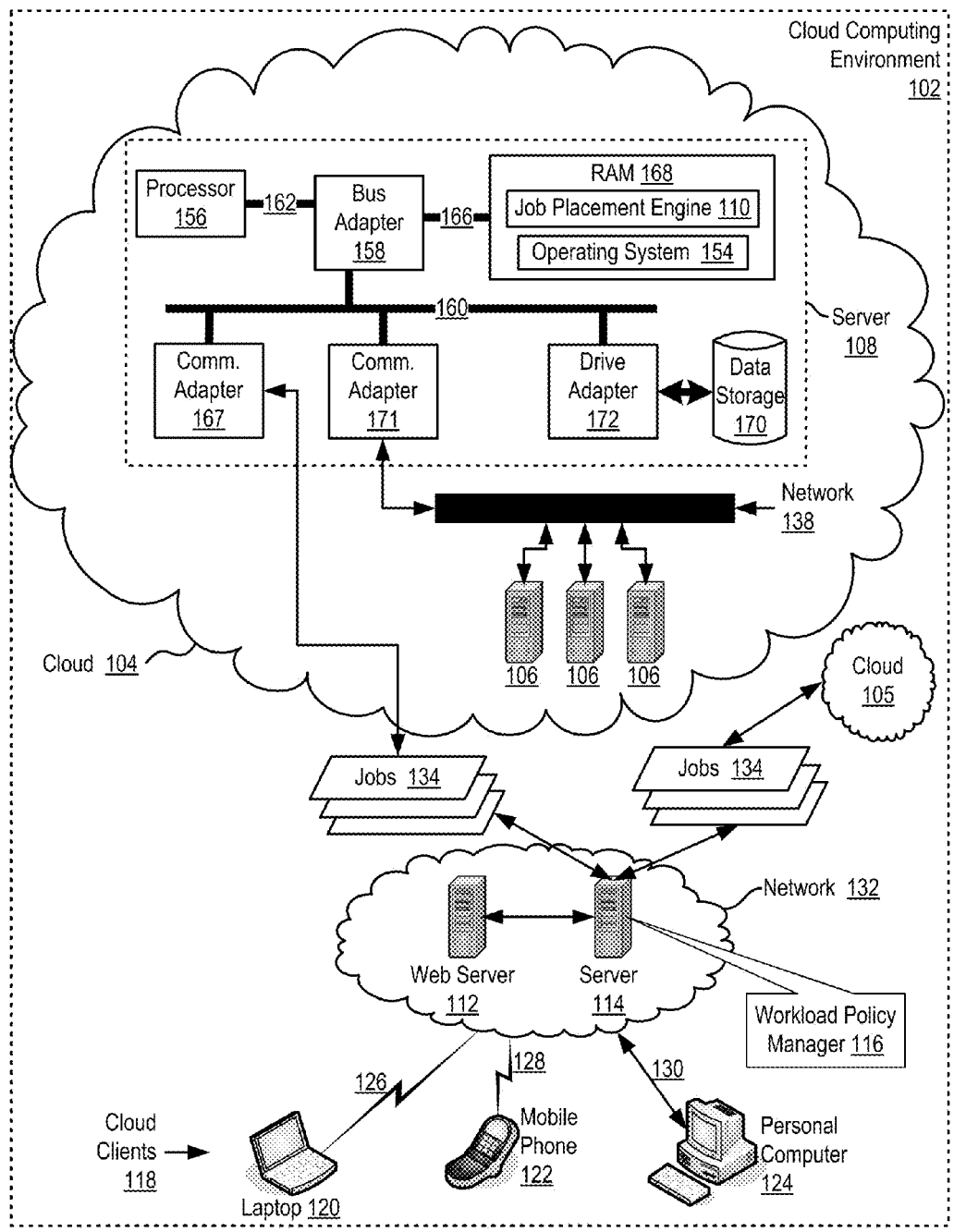

For further explanation of job placement engines, FIG. 4 sets forth a network diagram of a cloud computing environment (102) that supports data processing workload administration according to embodiments of the present invention, including a functional block diagram of a server (108) running a job placement engine (110). The cloud computing environment (102) in the example of FIG. 4 is like the cloud computing environment of FIG. 1, including as it does cloud clients (118) coupled for data communications through a data communications network (132) to a workload policy manager (116), running on a server (114), that distributes data processing jobs (134) among a number of clouds (104, 105).

The server (108) running the job placement engine (110) in the example of FIG. 4 includes at least one computer processor (156) or 'CPU' as well as random access memory (168) ('RAM') which is connected through a high speed memory bus (166) and bus adapter (158) to processor (156) and to other components of the server (108). Stored in RAM (168) is a job placement engine (110), a module of automated computing machinery configured to deploy data processing jobs (134) onto servers (106) in a cloud (104), determine whether workload execution policies are met, and advise the workload policy manager (116) when workload execution policy for a job cannot be met by resources within the cloud. In this example, the job placement engine (110) is represented for ease or explanation as a user-level module of computer program instructions configured to deploy jobs, monitor job execution, and advise the workload policy manager (116) when workload execution policies are not met, with the job placement engine operating on a generally programmable computer server (108), although such an architecture or implementation is not a limitation of the present invention. Job placement engines according to embodiments of the present invention can be implemented alternatively, for example, as Complex Programmable Logic Devices ('CPLDs'), Field Programmable Gate Arrays ('FPGAs'), or Application-Specific Integrated Circuits ('ASICs'). In this particular example, with only one application running on the server (108) and that being the job placement engine (110), the server (108) itself is effectively implemented as a job placement engine.

Also stored in RAM (168) in the example of FIG. 4 is an operating system (154). Operating systems useful with job placement engines for data processing workload administration in a cloud computing environment according to embodiments of the present invention include UNIX™, Linux™, Microsoft XP™, AIX™, IBM's i5/OS™, and others as will occur to those of skill in the art. The job placement engine (110) and the operating system (154) in the example of FIG. 4 are shown in RAM (168), but many components of such software typically are stored in non-volatile memory also, such as, for example, on a disk drive (170).

The server (108) of FIG. 4 includes disk drive adapter (172) coupled through expansion bus (160) and bus adapter (158) to processor (156) and other components of the server (108). Disk drive adapter (172) connects non-volatile data storage to the server (108) in the form of disk drive (170). Disk drive adapters useful in computers for data processing workload administration in a cloud computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (108) of FIG. 4 includes communications adapters (167, 171) for data communications through data communications networks (132, 138) with the workload policy manager (116) and with servers (106) in the clouds (104). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing workload administration in a cloud computing environment according to embodiments of the present invention include modems for wired dial-up communications, Ethernet (IEEE 802.3) adapters for wired data communications network communications, and 802.11 adapters for wireless data communications network communications.

Figure 5:
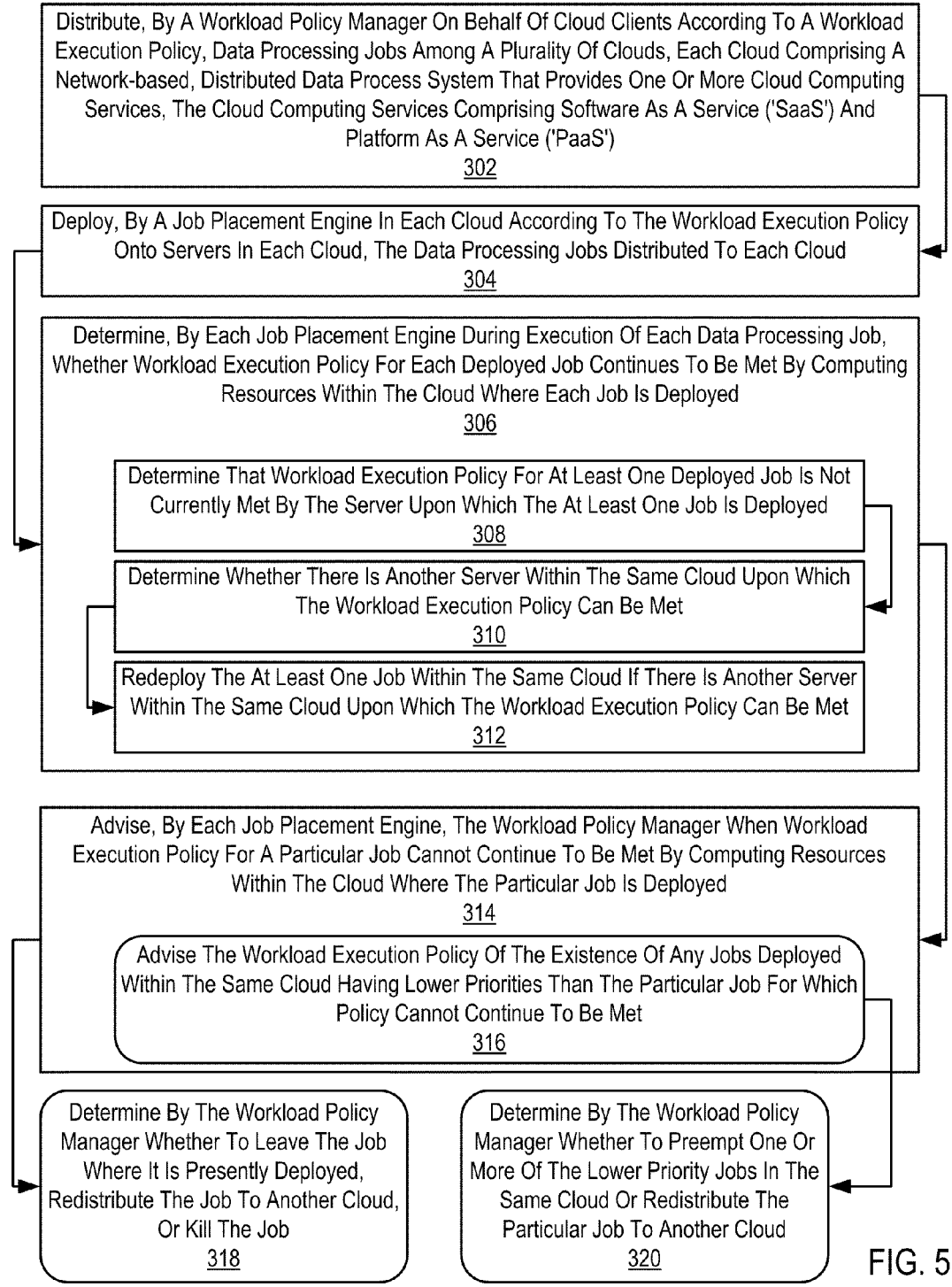
FIG. 5 sets forth a flow chart illustrating an example method of data processing workload administration in a cloud computing environment according to embodiments of the present invention.

For further explanation, FIG. 5 sets forth a flow chart illustrating an example method of data processing workload administration in a cloud computing environment according to embodiments of the present invention. The method of FIG. 5 is implemented in a cloud computing environment (102) like the one illustrated and explained above with reference to FIG. 1, that is, a cloud computing environment that includes cloud clients (118) coupled for data communications through a data communications network (132) to a workload policy manager (116), running on a server (114), that distributes data processing jobs (134) among a number of clouds (104, 105), where each cloud has its own job placement engine (110, 111). Because the method of FIG. 5 is implemented in a cloud computing environment (102) like the cloud computing environment of FIG. 1, the method of FIG. 5 is explained both with reference to FIG. 5 and also with reference to FIG. 1, using reference numbers from both Figures. The method of FIG. 5 includes distributing (302), by a workload policy manager (116) on behalf of cloud clients (118) according to a workload execution policy (117), data processing jobs (134) among a plurality of clouds (104, 105). Each cloud is a network-based, distributed data processing system that provides one or more cloud computing services, and the cloud computing services provided by such clouds include Software as a Service ('SaaS') and Platform as a Service ('Paas').

The method of FIG. 5 also includes deploying (304), by a job placement engine (110, 111) in each cloud according to the workload execution policy (117) onto servers (106, 107) in each cloud, the data processing jobs (134) distributed to each cloud. The method of FIG. 5 also includes determining (306), by each job placement engine (110, 111) during execution of each data processing job (134), whether workload execution policy (117) for each deployed job continues to be met by computing resources within the cloud where each job is deployed. In the method of FIG. 5, determining (306) whether workload execution policy for each deployed job continues to be includes determining (308) that workload execution policy for at least one deployed job is not currently met by the server upon which the at least one job is deployed, determining (310) whether there is another server within the same cloud upon which the workload execution policy can be met, and redeploying (312) the at least one job within the same cloud if there is another server within the same cloud upon which the workload execution policy can be met—so that the job placement engines (110, 111) do not report failures to the workload policy manager (116) for jobs that can be redeployed within the same cloud. The method of FIG. 5 also includes advising (314), by each job placement engine (110, 111), the workload policy manager (116) when workload execution policy for a particular job cannot continue to be met by computing resources within the cloud where the particular job is deployed. The method of FIG. 5 also includes the alternative step of determining (318) by the workload policy manager whether to leave the job where it is presently deployed, redistribute the job to another cloud, or kill the job. Step (318) is said to be an alternative, because as explained just below, FIG. 5 explains another way for the job placement engines (110, 111) and the workload policy manager (116) to handle failures.

That is, in the method of FIG. 5 advising (314) the workload policy manager (116) when workload execution policy (117) for a particular job cannot continue to be met by computing resources within the cloud where the particular job is deployed includes the alternative step of advising (216) the workload policy manager of the existence of any jobs deployed within the same cloud having lower priorities than the particular job for which policy cannot continue to be met. In such a circumstance, the method of FIG. 5 provides the additional alternative of determining (320) by the workload policy manager (116) whether to preempt one or more of the lower priority jobs in the same cloud or redistribute the particular job to another cloud.

In view of the explanations set forth above, readers will recognize that the benefits of data processing workload administration in a cloud computing environment according to embodiments of the present invention include self-regulating or 'autonomic' adaptive redistribution of data processing workloads in cloud computing environments when workload execution policy requirements are not being met. Readers will also note that example embodiments of the present invention are described in this specification largely in the context of fully functional computer systems for data processing workload administration in a cloud computing environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data processing workload administration in a cloud computing environment, the method comprising:

distributing, by a workload policy manager on behalf of cloud clients according to a workload execution policy, data processing jobs among a plurality of clouds, each cloud comprising a network-based, distributed data processing system that provides one or more cloud computing services, the cloud computing services comprising Software as a Service ('SaaS') and Platform as a Service ('Paas');

deploying, by a job placement engine in each cloud according to the workload execution policy onto servers in each cloud, the data processing jobs distributed to each cloud;

determining, by each job placement engine during execution of each data processing job, whether workload execution policy for each deployed job continues to be met by computing resources within the cloud where each job is deployed;

advising, by each job placement engine, the workload policy manager when workload execution policy for a particular job cannot continue to be met by computing resources within the cloud where the particular job is deployed, the advising comprising:

advising the workload policy manager of the existence of any jobs deployed within the same cloud having lower priorities than the particular job for which policy cannot continue to be met; and determining by the workload policy manager whether to preempt one or more of the lower priority jobs in the same cloud or redistribute the particular job to another cloud.

2. The method of claim 1 wherein:

the workload policy manager comprises a module of automated computing machinery configured to distribute data processing jobs among clouds;

the workload execution policy comprises an association of data processing job specifications for the data processing jobs and cloud computing resources provided by the clouds; and each cloud comprises a job placement engine, and each job placement engine comprises a module of automated computing machinery configured to deploy data processing jobs on servers of a cloud.

3. The method of claim 1 wherein each cloud client comprises a module of automated computing machinery that requires cloud computing services for application delivery.

4. The method of claim 1 wherein the cloud computing services further comprise managed services, utility computing, and web services.

5. The method of claim 1 wherein determining whether workload execution policy for each deployed job continues to be met comprises:
   determining that workload execution policy for at least one deployed job is not currently met by the server upon which the at least one job is deployed;
   determining whether there is another server within the same cloud upon which the workload execution policy can be met; and
   redeploying the at least one job within the same cloud if there is another server within the same cloud upon which the workload execution policy can be met.

6. The method of claim 1 further comprising determining by the workload policy manager whether to leave the job where it is presently deployed, redistribute the job to another cloud, or kill the job.

7. Apparatus data processing workload administration in a cloud computing environment, the apparatus comprising computer processors and computer memory operatively coupled to the computer processors, the computer memory having disposed within it computer program instructions capable when executed of causing the apparatus to function by:
   distributing, by a workload policy manager on behalf of cloud clients according to a workload execution policy, data processing jobs among a plurality of clouds, each cloud comprising a network-based, distributed data processing system that provides one or more cloud computing services, the cloud computing services comprising Software as a Service ('SaaS') and Platform as a Service ('Paas');
   deploying, by a job placement engine in each cloud according to the workload execution policy onto servers in each cloud, the data processing jobs distributed to each cloud;
   determining, by each job placement engine during execution of each data processing job, whether workload execution policy for each deployed job continues to be met by computing resources within the cloud where each job is deployed;
   advising, by each job placement engine, the workload policy manager when workload execution policy for a particular job cannot continue to be met by computing resources within the cloud where the particular job is deployed, the advising comprising:
      advising the workload policy manager of the existence of any jobs deployed within the same cloud having lower priorities than the particular job for which policy cannot continue to be met; and
   determining by the workload policy manager whether to preempt one or more of the lower priority jobs in the same cloud or redistribute the particular job to another cloud.

8. The apparatus of claim 7 wherein:
   the workload policy manager comprises a module of automated computing machinery configured to distribute data processing jobs among clouds;
   the workload execution policy comprises an association of data processing job specifications for the data processing jobs and cloud computing resources provided by the clouds; and
   each cloud comprises a job placement engine, and each job placement engine comprises a module of automated computing machinery configured to deploy data processing jobs on servers of a cloud.

9. The apparatus of claim 7 wherein each cloud client comprises a module of automated computing machinery that requires cloud computing services for application delivery.

10. The apparatus of claim 7 wherein the cloud computing services further comprise managed services, utility computing, and web services.

11. The apparatus of claim 7 wherein determining whether workload execution policy for each deployed job continues to be met comprises:
   determining that workload execution policy for at least one deployed job is not currently met by the server upon which the at least one job is deployed;
   determining whether there is another server within the same cloud upon which the workload execution policy can be met; and
   redeploying the at least one job within the same cloud if there is another server within the same cloud upon which the workload execution policy can be met.

12. The apparatus of claim 7 further comprising computer program instructions capable when executed of causing the apparatus to function by determining by the workload policy manager whether to leave the job where it is presently deployed, redistribute the job to another cloud, or kill the job.

13. A computer program product for data processing workload administration in a cloud computing environment, the computer program product disposed upon a computer readable storage medium, wherein the computer readable storage medium is not a signal, the computer program product comprising computer program instructions capable, when executed, of causing to function by:
   distributing, by a workload policy manager on behalf of cloud clients according to a workload execution policy, data processing jobs among a plurality of clouds, each cloud comprising a network-based, distributed data processing system that provides one or more cloud computing services, the cloud computing services comprising Software as a Service ('SaaS') and Platform as a Service ('Paas');
   deploying, by a job placement engine in each cloud according to the workload execution policy onto servers in each cloud, the data processing jobs distributed to each cloud;
   determining, by each job placement engine during execution of each data processing job, whether workload execution policy for each deployed job continues to be met by computing resources within the cloud where each job is deployed;
   advising, by each job placement engine, the workload policy manager when workload execution policy for a particular job cannot continue to be met by computing resources within the cloud where the particular job is deployed, the advising comprising:
      advising the workload policy manager of the existence of any jobs deployed within the same cloud having lower priorities than the particular job for which policy cannot continue to be met; and determining by the workload policy manager whether to preempt one or more of the lower priority jobs in the same cloud or redistribute the particular job to another cloud.

14. The computer program product of claim 13 wherein:

the workload policy manager comprises a module of automated computing machinery configured to distribute data processing jobs among clouds;

the workload execution policy comprises an association of data processing job specifications for the data processing jobs and cloud computing resources provided by the clouds; and each cloud comprises a job placement engine, and each job placement engine comprises a module of automated computing machinery configured to deploy data processing jobs on servers of a cloud.

15. The computer program product of claim 13 wherein each cloud client comprises a module of automated computing machinery that requires cloud computing services for application delivery.

16. The computer program product of claim 13 wherein determining whether workload execution policy for each deployed job continues to be met comprises:

determining that workload execution policy for at least one deployed job is not currently met by the server upon which the at least one job is deployed;

determining whether there is another server within the same cloud upon which the workload execution policy can be met; and redeploying the at least one job within the same cloud if there is another server within the same cloud upon which the workload execution policy can be met.

17. The computer program product of claim 13 further comprising computer program instructions capable when executed of causing automated computing machinery to function by determining by the workload policy manager whether to leave the job where it is presently deployed, redistribute the job to another cloud, or kill the job.

* * * * *